(12) United States Patent
Tanjo et al.

(10) Patent No.: US 9,680,153 B2
(45) Date of Patent: Jun. 13, 2017

(54) NONAQUEOUS ELECTROLYTE SECONDARY BATTERY

(71) Applicant: Automotive Energy Supply Corporation, Zama-shi, Kanagawa (JP)

(72) Inventors: Yuji Tanjo, Zama (JP); Yoshihiro Niida, Zama (JP)

(73) Assignee: AUTOMOTIVE ENERGY SUPPLY CORPORATION, Kanagawa (JP)

(*) Notice: Subject to any disclaimer, the term of this patent is extended or adjusted under 35 U.S.C. 154(b) by 124 days.

(21) Appl. No.: 14/658,833

(22) Filed: Mar. 16, 2015

(65) Prior Publication Data

US 2015/0311531 A1 Oct. 29, 2015

(30) Foreign Application Priority Data

Apr. 23, 2014 (JP) ................................. 2014-089670

(51) Int. Cl.
*H01M 4/62* (2006.01)
*H01M 10/05* (2010.01)
(Continued)

(52) U.S. Cl.
CPC .......... *H01M 4/623* (2013.01); *H01M 4/502* (2013.01); *H01M 4/625* (2013.01); *H01M 4/661* (2013.01); *H01M 10/05* (2013.01)

(58) Field of Classification Search
None
See application file for complete search history.

(56) References Cited

U.S. PATENT DOCUMENTS

2002/0037450 A1* 3/2002 Suzuki ................. H01M 4/131
429/94
2003/0049527 A1 3/2003 Yageta et al.
(Continued)

FOREIGN PATENT DOCUMENTS

JP 2000-260478 A 9/2000
JP 2001202993 A 7/2001
(Continued)

OTHER PUBLICATIONS

Extended European Search Report issued on Aug. 26, 2015 in corresponding European Patent Application No. 15159060.1.

*Primary Examiner* — Patrick Ryan
*Assistant Examiner* — Wyatt McConnell
(74) *Attorney, Agent, or Firm* — Troutman Sanders LLP

(57) ABSTRACT

A nonaqueous electrolyte secondary battery includes a power generating element including a positive electrode having a positive electrode active material layer and a negative electrode having a negative electrode active material layer. A main plane having the smaller area, between a main plane of the positive electrode active material layer and a main plane of the negative electrode active material layer, has an approximately rectangular shape with a short side having a length of 132 mm or more. The positive electrode active material layer and the negative electrode active material layer are provided such that the main plane of the positive electrode active material layer and the main plane of the negative electrode active material layer face each other with a separator interposed therebetween, and the positive electrode active material layer contains a binder in an amount of 2 mass % or more and 3.5 mass % or less.

10 Claims, 2 Drawing Sheets

(51) Int. Cl.
*H01M 4/50* (2010.01)
*H01M 4/66* (2006.01)

(56) References Cited

U.S. PATENT DOCUMENTS

| | | |
|---|---|---|
| 2004/0175609 A1 | 9/2004 | Yageta et al. |
| 2006/0210872 A1 | 9/2006 | Yageta et al. |
| 2014/0106239 A1 | 4/2014 | Barchasz et al. |
| 2015/0263334 A1* | 9/2015 | Miyazaki .............. H01M 4/505 |
| | | 429/144 |

FOREIGN PATENT DOCUMENTS

| | | |
|---|---|---|
| JP | 2002-270241 A | 9/2002 |
| JP | 2003288883 A | 10/2003 |
| JP | 2004265762 A | 9/2004 |
| JP | 2009187753 A | 8/2009 |
| JP | 2011-238415 A | 11/2011 |
| JP | 2012-138322 A | 7/2012 |
| JP | 2012-190734 A | 10/2012 |
| JP | 2013084416 A | 5/2013 |
| JP | 2013-149408 | 8/2013 |
| KR | 20090019734 A | 2/2009 |
| WO | 2005/091398 A1 | 9/2005 |
| WO | 2014/050114 A1 | 4/2014 |

\* cited by examiner

NONAQUEOUS ELECTROLYTE SECONDARY BATTERY

CROSS-REFERENCE TO RELATED APPLICATION

This application claims priority from Japanese Patent Application No. 2014-089670 filed with the Japan Patent Office on Apr. 23, 2014, the entire content of which is hereby incorporated by reference.

BACKGROUND

1. Technical Field

The present disclosure relates to a nonaqueous electrolyte secondary battery.

2. Related Art

As a nonaqueous electrolyte secondary battery, for example, a lithium ion secondary battery has been known. In the lithium ion secondary battery, a power generating element including a positive electrode plate in which a lithium composite oxide or the like is used as an active material, a negative electrode plate in which a carbon material or the like (such as graphite) is used as an active material, and a plurality of stacked separators, and an electrolyte containing lithium salt or the like (such as a nonaqueous electrolyte having lithium salt or the like dissolved therein) are housed in an exterior body such as a laminate film. It has been known that the structure of an electrode is roughly classified into a wound type and a stacked type. The wound type includes a rectangular positive electrode plate and a negative electrode plate, which are wound with a separator interposed therebetween. The stacked type includes a plurality of sheet-like positive electrode plates and negative electrode plates stacked alternately with a separator interposed therebetween. The positive electrodes and the negative electrodes integrated to extract current from the sheets are respectively connected to a positive electrode terminal and a negative electrode terminal as external terminals. The stacked type is advantageous as a large-current type battery.

A nonaqueous electrolyte secondary battery is required to have higher capacity characteristics and output characteristics, etc. (for example, JP-A-2013-149408). As a method of increasing the capacity of a stacked type nonaqueous electrolyte secondary battery, there is a method of increasing the area of each electrode plate by increasing the area of the main plane of the entire battery. In another method, the capacity is increased by increasing the number of stacked plates (by increasing the thickness of the battery) instead of increasing the area of the main plane of the entire battery. However, the former method, in which the battery is thinner, i.e., the battery has a larger area, is superior in point of heat dissipation or the like.

SUMMARY

A nonaqueous electrolyte secondary battery includes a power generating element including a positive electrode having a positive electrode active material layer and a negative electrode having a negative electrode active material layer. A main plane having the smaller area, between a main plane of the positive electrode active material layer and a main plane of the negative electrode active material layer, has an approximately rectangular shape with a short side having a length of 132 mm or more. The positive electrode active material layer and the negative electrode active material layer are provided such that the main plane of the positive electrode active material layer and the main plane of the negative electrode active material layer face each other with a separator interposed therebetween, and the positive electrode active material layer contains a binder in an amount of 2 mass % or more and 3.5 mass % or less.

DETAILED DESCRIPTION

Figure 1:
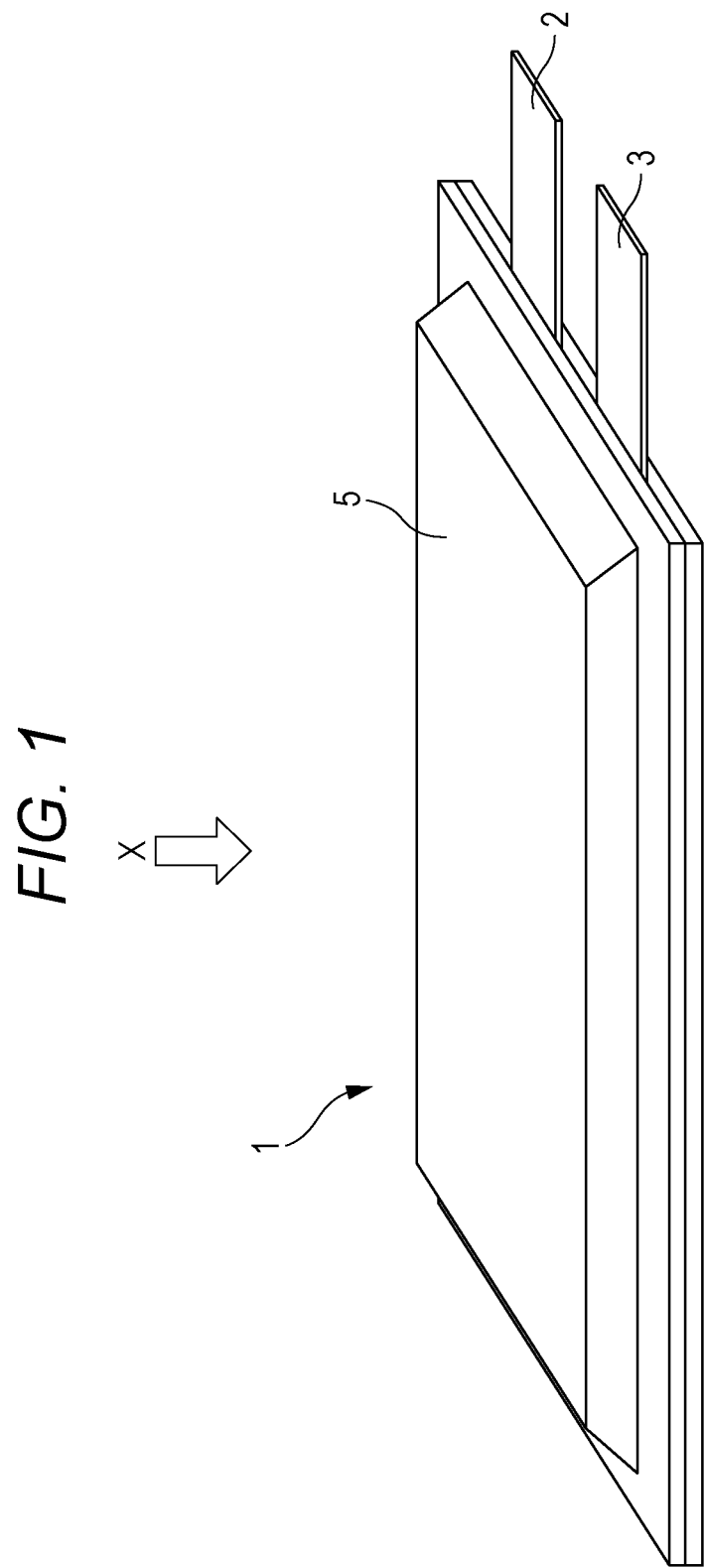
FIG. 1 is an external diagram of a stacked type lithium ion secondary battery, which is an example of a nonaqueous electrolyte secondary battery according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It has been found out that, if the area of an electrode plate in parallel to a main plane of a stacked type nonaqueous electrolyte secondary battery is increased, the cycle characteristics of the nonaqueous electrolyte secondary battery may deteriorate under a certain material condition of active material layers of a positive electrode and a negative electrode.

An object of an embodiment of the present disclosure is to suppress the deterioration in cycle characteristics and increase the capacity of a large-area stacked type nonaqueous electrolyte secondary battery.

A nonaqueous electrolyte secondary battery according to an aspect of the present invention to achieve the above-mentioned object includes a power generating element including a positive electrode having a positive electrode active material layer and a negative electrode having a negative electrode active material layer. A main plane having the smaller area, between a main plane of the positive electrode active material layer and a main plane of the negative electrode active material layer, has an approximately rectangular shape with a short side having a length of 132 mm or more. The positive electrode active material layer and the negative electrode active material layer are provided such that the main plane of the positive electrode active material layer and the main plane of the negative electrode active material layer face each other with a separator interposed therebetween, and the positive electrode active material layer contains a binder in an amount of 2 mass % or more and 3.5 mass % or less.

A nonaqueous electrolyte secondary battery according to another aspect of the present invention to achieve the above-mentioned object includes a power generating element including a positive electrode having a positive electrode active material layer and a negative electrode having a negative electrode active material layer. A main plane having the smaller area, between a main plane of the positive electrode active material layer and a main plane of the negative electrode active material layer, has an approximately rectangular shape with a short side having a length of 132 mm or more. The positive electrode active material layer and the negative electrode active material layer are provided such that the main plane of the positive electrode active material layer and the main plane of the negative electrode active material layer face each other with a separator interposed therebetween, and an adhesion quantity to area ratio (mg/m$^2$) of the binder in the positive electrode active material layer is 8 or more and 14 or less.

According to the nonaqueous electrolyte secondary battery according to the embodiment, the deterioration in cycle characteristics of the stacked type nonaqueous electrolyte secondary battery that has thin and large-area electrodes can be suppressed.

The nonaqueous electrolyte secondary battery according to the embodiment of the present disclosure will be described below with reference to the drawings.

The present inventors have conducted intensive studies for solving the problem that the cycle characteristics of the nonaqueous electrolyte secondary battery are deteriorated as the electrode size (the main plane of the negative electrode active material layer facing the positive electrode, and the main plane of the positive electrode active material layer facing the negative electrode) is increased. As a result, it was found out that, when the electrode size exceeded a certain size under a certain material condition, the insulating precipitate appeared in the center of the negative electrode active material layer in the cycle test. This phenomenon was not observed in the case of a smaller electrode including the same material (for example, the electrode size was less than 132 mm×132 mm). As a result of further examinations based on these findings, it was found out that, by setting the specific surface area of the positive electrode material, the content of the binder, and the relation therebetween, the generation of the precipitate in the negative electrode active material layer was suppressed and the deterioration in cycle characteristics of the nonaqueous electrolyte secondary battery was suppressed even when the electrode size was large. Thus, the nonaqueous electrolyte secondary battery according to the embodiment of the present disclosure has been completed.

[Structure of Nonaqueous Electrolyte Secondary Battery]

A structure of a nonaqueous electrolyte secondary battery (hereinafter referred to as a secondary battery) according to the embodiment of the present disclosure will be described based on an example of a lithium ion secondary battery.

As illustrated in FIG. 1, a secondary battery 1 has a flat rectangular-parallelepiped external shape. The secondary battery 1 has a pair of terminals 2 and 3 on one edge in a longitudinal direction.

Figure 2:
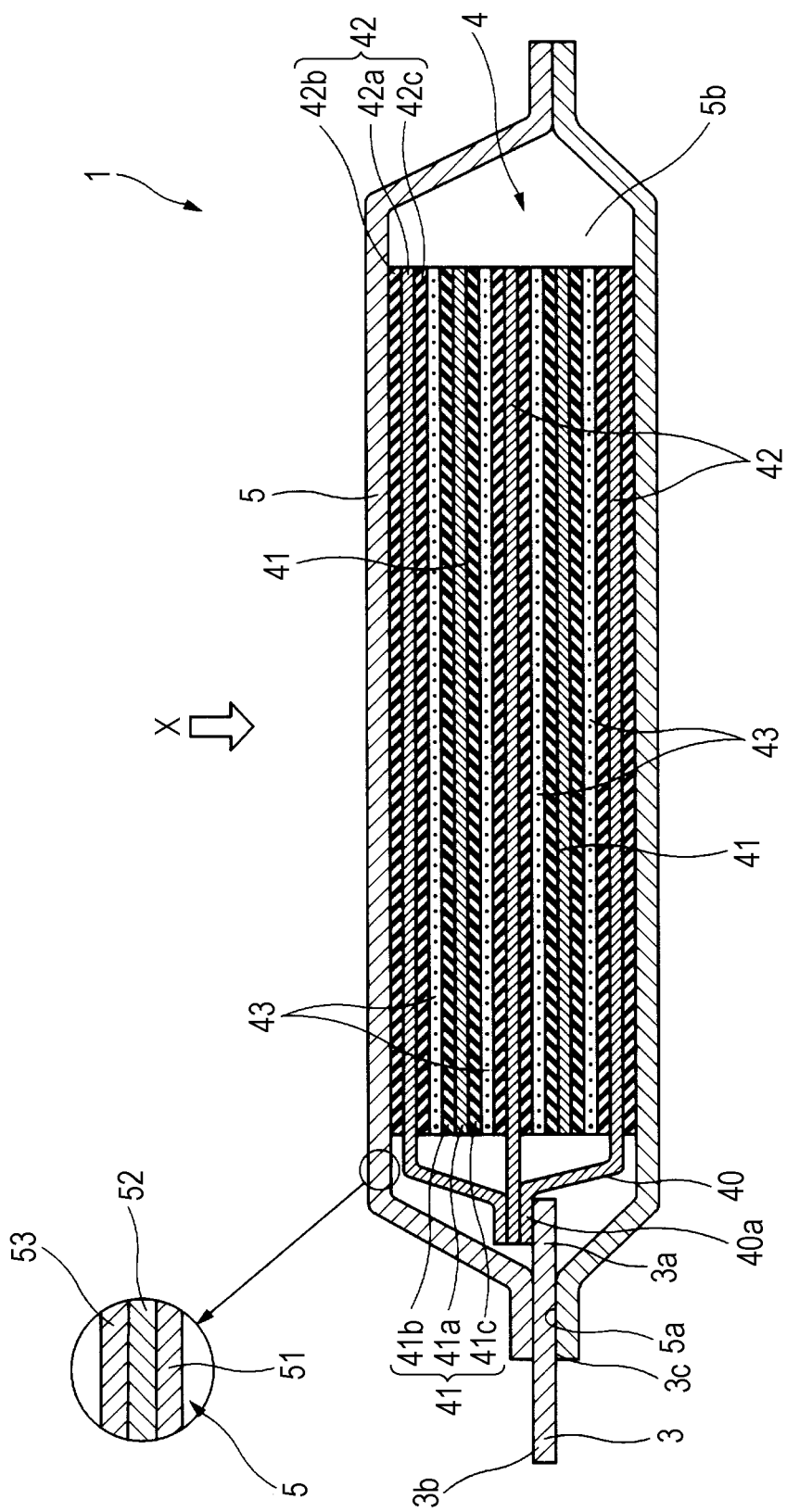
FIG. 2 is a schematic sectional diagram of the stacked type lithium ion secondary battery of FIG. 1.

As illustrated in FIG. 2, the secondary battery 1 includes an exterior body 5 including two laminate films housing a power generating element 4 with a rectangular shape when viewed from an arrow X (flat surface) direction and the electrolyte (not shown) inside. The power generating element 4 includes a plurality of positive electrode plates 41 and negative electrode plates 42 alternately stacked with a separator 43 interposed therebetween. In this example, the power generating element 4 includes three negative electrode plates 42, two positive electrode plates 41, and four separators 43 provided therebetween. The negative electrode plate 42 is disposed as the outermost layer of the power generating element 4. Note that the dimension of each portion in FIG. 2 is not necessarily accurate. The dimension is exaggerated partially for the explanation. The power generating element 4 can alternatively have the positive electrode plate 41 as the outermost layer.

The positive electrode plate 41 includes positive electrode active material layers 41b and 41c formed on opposite surfaces of a positive electrode current collector 41a with a substantially rectangular shape when viewed from the arrow X direction in FIGS. 1 and 2. The positive electrode current collector 41a includes, for example, an electrochemically stable metal foil such as an aluminum foil, an aluminum alloy foil, a copper foil, and a nickel foil. The positive electrode active material layers 41b and 41c may be formed as below. A mixture (positive electrode slurry) of a positive electrode active material including a lithium composite oxide such as lithium nickelate (for example, $LiNiO_2$), lithium manganite (for example, $LiMnO_2$), spinel lithium manganite (for example, $LiMn_2O_4$), and lithium cobaltate (for example, $LiCoO_2$), a binder, a conductive auxiliary agent added as necessary, and a solvent that can dissolve the binder is applied on a main plane of the positive electrode current collector 41a. Next, the applied positive electrode current collector 41a is dried to remove the solvent. Here, part of the transition metal (Ni, Mn, Co) of the lithium composite oxide may be replaced by Li, Mg, B, Al, V, Cr, Fe, Co, Ni, Mn, W, Ti, or the like. In the positive electrode active material layers 41b and 41c, a conductive auxiliary agent including a carbon material such as acetylene black, carbon black, graphite, or fibrous carbon may be added.

Note that at least part of the lithium composite oxide used for the positive electrode active material layers 41b and 41c may be spinel type. This is because this type of material has a crystal structure that is more stable than the other materials and therefore the crystal structure change due to the intercalation and deintercalation of lithium by charging and discharging is small. Thus, the size reduction of a pore between particles due to deformation of the particles is suppressed. As a result, the deterioration in Li ion mobility in an electrode surface direction to be described below is suppressed.

As the binder, for example, polyvinylidene fluoride (PVDF), vinylidene fluoride-hexafluoropropylene copolymer, vinylidene fluoride-tetrafluoroethylene copolymer, styrene-butadiene copolymer rubber, carboxymethyl cellulose, polytetrafluoroethylene, polypropylene, polyethylene, polyimide, or polyamideimide may be used alone or in combination. The binder used for the positive electrode active material layers 41b and 41c can be used as the binder for the negative electrode active material layers 42b and 42c.

The positive electrode plate obtained by drying the current collector on which the positive electrode slurry has been applied may be further subjected to the heat treatment in addition to the drying. The preferable condition of the heat treatment is 1 to 10 hours at 100° C. to 150° C. in the case of using polyvinylidene fluoride materials (polyvinylidene fluoride, vinylidene fluoride-hexafluoropropylene copolymer, vinylidene fluoride-tetrafluoroethylene copolymer, or the like) as the binder. This suppresses the swelling of the binder due to the organic solvent included in the electrolyte. Thus, this can be used in the embodiment of the present disclosure.

The porosity of the positive electrode active material layer may be 15% to 40%. When the porosity is too small, the mobility of lithium ions to be described below in a direction parallel to the electrode surface deteriorates. When the porosity is too large, the active material quantity per volume is reduced to cause the capacity loss.

The negative electrode plate 42 includes the negative electrode active material layers 42b and 42c formed on opposite surfaces of a negative electrode current collector 42a with a substantially rectangular shape when viewed from the arrow X direction in FIGS. 1 and 2. The negative electrode current collector 42a includes, for example, an electrochemically stable metal foil such as a copper foil, a stainless steel foil, and an iron foil. The negative electrode active material layers 42b and 42c are formed by applying on a main plane of the negative electrode current collector 42a, a mixture of a negative electrode active material that intercalates or deintercalates lithium ions such as amorphous carbon, non-graphitizable carbon, graphitizable carbon, graphite, or graphite coated with amorphous carbon, and a binder. In the negative electrode active material layers 42b and 42c, a conductive auxiliary agent including a carbon material such as acetylene black, carbon black, graphite, or fibrous carbon may be added.

A part of the edge of the negative electrode current collector 42a in the longitudinal direction extends as an extension portion 40 that does not include the negative electrode active material layers 42b and 42c. An end portion 40a of the extension portion 40 is joined to one end portion 3a of a negative electrode terminal 3. If there are plural negative electrode current collectors 42a, the end portions 40a of the extension portions 40 of the negative electrode current collectors 42a are bundled into one to be unified. The unified end portions 40a are joined to the negative electrode terminal 3. This similarly applies to the positive electrode, and if there are plural extension portions extended from the positive electrode current collector 41a, the bundled extension portions are joined to one end portion of the positive electrode terminal.

The separator 43 prevents the short-circuiting between the positive electrode plate 41 and the negative electrode plate 42. The separator 43 has a function of holding the electrolyte. For example, the separator 43 is formed of a microporous film including polyolefin such as polyethylene (PE) or polypropylene (PP). The separator 43 is not limited to a single layer film of polyolefin. A film with a three-layer structure in which a polypropylene film is sandwiched between polyethylene films, or a film obtained by stacking a polyolefin microporous film and an organic nonwoven fabric can also be used as the separator 43. Further, a polyolefin microporous film with inorganic particles of silica, alumina, magnesia, zirconia, titania, or the like attached to one surface or both surfaces thereof may be used. Moreover, a polyolefin film having these inorganic particles dispersed inside may be used. The thickness of the separator may be 10 μm to 40 μm. When the separator is too thin, the mechanical strength may be insufficient. When the separator is too thick, the lithium ion mobility between the front and rear surfaces of the separator to be described below is reduced.

The separator does not necessarily adhere to at least the positive electrode. This is because, as described below, the interface mobility of lithium ions in the electrolyte existing at the interface between the separator and the positive electrode is important for the nonaqueous electrolyte secondary battery according to the embodiment of the present disclosure. In other words, if an adhesive layer is present at this interface, the adhesive layer operates to interrupt the transfer of lithium ions within the interface.

The exterior body 5 includes, for example, a laminate film with a three-layer structure of a heat seal layer 51, a metal layer 52, and a protective layer 53, part of which is illustrated in FIG. 2 in an enlarged manner. The metal layer 52 in the middle is formed of, for example, an aluminum foil. The heat seal layer 51 covering the inner side surface of the metal layer 52 is formed of, for example, synthetic resin capable of heat sealing such as polypropylene (PP). The protective layer 53 covering the outer side surface of the metal layer 52 is formed of, for example, synthetic resin with excellent durability and heat resistance, such as polyethylene terephthalate (PET). Alternatively, a laminate film with more layers can be used. The synthetic resin layer on the outer side of the metal layer 52 is not essential. A structure including the synthetic resin layer only on the inner surface may be employed. The laminate film has a thickness of 0.05 to 0.8 mm.

As an example of the exterior body 5, an exterior body with a two-film structure including one laminate film disposed on a lower surface side of the power generating element 4 and another laminate film disposed on an upper surface side thereof may be given. In this example, the four sides of these two laminate films are overlapped on each other, and then heat sealed. In another example, the exterior body 5 is formed of one relatively large laminate film. In this example, three sides of the power generating element 4 disposed inside the two-fold laminate film are overlapped on each other, and heat sealed.

In the pair of terminals 2 and 3 arranged on the short side of the secondary battery 1, when the laminate films of the exterior body 5 are heat sealed, extension portions of the current collectors 41a and 42a (extension portion 40 in the case of the negative electrode current collector 42a) are joined to one end portion (in the case of the negative electrode terminal 3, the one end portion 3a) of each terminal located inside of the exterior body 5. These terminals are led out to the outside through a joining surface 5a of the laminate film so that the other end portion of each terminal (the other end portion 3b in the case of the negative electrode terminal 3) is located outside the exterior body 5. In other words, the pair of terminals 2 and 3 is held by the joining surface 5a of the laminate film of the exterior body 5 between the one end portion and the other end portion (one end portion 3a and the other end portion 3b in the case of the negative electrode terminal 3). The terminals 2 and 3 are sealed in a held portion 3c. Note that, in FIG. 1, the pair of terminals 2 and 3 is disposed side by side at one edge of the secondary battery 1. Alternatively, the positive electrode terminal 2 may be disposed at one edge of the secondary battery and the negative electrode terminal 3 may be disposed at the other edge.

As the electrolyte, the electrolyte generally used for the lithium ion secondary battery such as a nonaqueous electrolyte in which lithium salt is dissolved in an organic solvent is used. As the organic solvent, for example, a solvent prepared by using one kind of, or combining two or more kinds of propylene carbonate, ethylene carbonate, dimethyl carbonate, diethyl carbonate, and ethylmethyl carbonate can be used. As the lithium salt, $LiPF_6$, $LiBF_4$, $LiCF_3SO_3$, $LiC_4F_9SO_3$, $LiN(CF_3SO_2)_2$, and $LiC(CF_3SO_2)_3$ can be used.

The amount of electrolyte includes the amount of extra electrolyte. The amount of extra electrolyte refers to the amount of electrolyte obtained by subtracting the total of the pore volume of the positive electrode plate 41, the pore volume of the negative electrode plate 42, and the pore volume of the separator 43 (hereinafter referred to as the pore volume of the power generating element 4) from the entire volume of the electrolyte existing in the exterior body 5. If the amount of extra electrolyte is a positive value, the ratio of the entire volume of electrolyte to the pore volume of the power generating element 4 is more than 1. This ratio may be more than 1. This ratio may be, however, in the range of 1.1 to 1.7 or 1.2 to 1.6. If the flat surface of the power generating element 4 is pressed from the outside of the exterior body 5 when the electrolyte having the positive extra electrolyte is housed in the exterior body 5, the electrolyte of the extra electrolyte (extra electrolyte) is moved to a peripheral portion 5b of the power generating element 4 in the exterior body 5 (for example, moved in a direction perpendicular to the stacking direction of the electrodes of the power generating element 4) and stored therein. For housing the storage, the power generating element 4 and the inner boundary of the exterior body 5 are preferably separated from each other by a distance of approximately 1 mm to 5 mm in the in-plane direction of the main plane. This separated portion for housing the storage can be provided between the exterior body 5 and each of four sides of the power generating element 4. The extra electrolyte serves as the source of supplying lithium ions to the power generating element 4, which is described below. Therefore, the lithium ions can be efficiently supplied from four directions. If the amount of extra electrolyte as the lithium ion supply source is too small because the distance between the separated portions is too small, the effect of the embodiment of the present disclosure is not obtained easily. In contrast, if the distance between the separated portions is too large, the battery external shape expands in a direction parallel to the main plane and thus the space efficiency becomes drastically deteriorated.

Example 1

The nonaqueous electrolyte secondary battery according to the embodiment of the present disclosure will be described in detail with reference to the specific examples. In Examples, a positive electrode plate with a main plane of a positive electrode active material layer facing a negative electrode, the main plane having a size of 200 mm×220 mm, was used. Moreover, a negative electrode plate with a main plane of a negative electrode active material layer facing a positive electrode, the main plane having a size of 204 mm×224 mm which was larger than the main plane of the positive electrode active material layer, was used.

<Manufacture of Positive Electrode Plate>

A positive electrode slurry was prepared by adding $Li_{1.1}Mn_{1.9}O_4$ powder with a spinel structure as a first positive electrode active material, lithium/nickel/cobalt/manganite lithium (Ni/Li molar ratio: 0.7) as a second positive electrode active material, polyvinylidene fluoride as a binder resin, and carbon black powder as a conductive auxiliary agent in a solvent of N-methyl-2-pyrrolidone (NMP) at a solid content mass ratio of 71:23:2:4.

This positive electrode slurry was applied on an aluminum foil. By drying the applied positive electrode slurry, the positive electrode active material layer was formed on the positive electrode plate. After that, roll pressing was performed. At this time, the porosity of the positive electrode active material layer was 22%. Moreover, in addition to the drying, the positive electrode plate with the positive electrode slurry applied thereon was heated for two hours at 130° C., thereby completing the positive electrode plate. The thickness and the size of the positive electrode active material layer on one surface were 79 μm and 200 mm×220 mm, respectively. The content of the binder in the positive electrode active material layer was 2 mass % based on the mass of the solid content of the positive electrode slurry. The adhesion quantity to area ratio of the binder was 8 mg/m$^2$. This value was obtained by calculating by a method to be described below, with the values of the BET specific surface areas of the first positive electrode active material, the second positive electrode active material, and the carbon black.

<Adhesion Quantity to Area Ratio>

The adhesion quantity to area ratio of the binder in the positive electrode active material layer refers to the value calculated by dividing the amount of binder in 1 g of the positive electrode active material layer (mg/g) by the average specific surface area (m$^2$/g) of the particle group of the positive electrode active material layer. In other words, if M represents the amount of binder in 1 g of the positive electrode active material layer and B represents the average specific surface area of the particle group of the positive electrode active material layer, the adhesion quantity to area ratio of the binder is defined by Formula (1). Note that B can be calculated by assigning the specific surface area of the particles included in the positive electrode active material layer obtained by the BET method ($X_1, X_2, X_3 \ldots X_n$) to Formula (2).

$$\text{Adhesion quantity to area ratio} = M/B \quad (1)$$

$$\text{Average specific surface area } (B) = X_1Y_1 + X_2Y_2 + X_3Y_3 + \ldots + X_nY_n \quad (2)$$

$X_1, X_2, X_3, \ldots, X_n$: BET specific surface area of particles included in the positive electrode active material layer (m$^2$/g)

$Y_1, Y_2, Y_3, \ldots, Y_n$ ($Y_1+Y_2+Y_3+ \ldots +Y_n=1$): ratio of particles included in the positive electrode active material layer (weight ratio)

<Manufacture of Negative Electrode Plate>

Spherical natural graphite powder coated with amorphous carbon as the negative electrode active material, polyvinylidene fluoride as a fluorine resin based binder resin, and a carbon black based conductive auxiliary agent were added to N-methyl-2-pyrrolidone (NMP) at a solid content mass ratio of 96.5:3:0.5. By stirring the obtained mixture, these solid materials were uniformly dispersed in NMP to prepare a negative electrode slurry. This negative electrode slurry was applied onto a copper foil. By drying the applied negative electrode slurry, the negative electrode active material layer was formed on the negative electrode plate. Then, this negative electrode plate was heated for two hours at 120° C., thereby manufacturing the negative electrode plate. The thickness and the size of the negative electrode active material layer on one surface were 60 μm and 204 mm×224 mm, respectively.

<Manufacturing Method for Secondary Battery>

As illustrated in FIG. 2, the power generating element 4 was manufactured by sequentially stacking the negative electrode plate 42, the separator 43, the positive electrode plate 41, and the separator 43. An inner end (one end portion 3a) of the negative electrode terminal 3 was joined to the extension portion 40 of the negative electrode current collector 42a of the negative electrode plate 42. Similarly, an inner end of the positive electrode terminal 2 was joined to the extension portion (not shown) of the positive electrode current collector 41a of the positive electrode plate 41. As the separator, a porous film (thickness 20 μm) of polypropylene was used. Next, this power generating element 4 was covered with a laminate film as the exterior body 5, and the laminate film was heat sealed on three sides other than the side with a filling port. One of the three sides was used as a terminal leading side. Moreover, an electrolyte was prepared by dissolving 1 M (mole) of LiPF$_6$ in a mix solvent containing ethylene carbonate and diethyl carbonate at 3:7. After filling the inside of the exterior body 5 with the obtained electrolyte through the filling port, the pressure in the exterior body 5 was reduced. Subsequently, the exterior body 5 was sealed by heat sealing the side with the filling port, thereby manufacturing the secondary battery 1. The distance between the power generating element 4 and the internal boundary of the exterior body 5, i.e., the internal boundary of the heat sealed portion was 7 mm at the terminal leading side and 3 mm at the other sides. The volume of the filling electrolyte was 1.4 times as large as the pore volume of the power generating element 4. Therefore, the extra electrolyte was present around the power generating element 4.

Example 2

The secondary battery was manufactured in the same manner as that of Example 1 except that the first positive electrode active material, the second positive electrode active material, the binder resin, and the conductive auxiliary agent were mixed at a solid content mass ratio of 70:23:3:4. The content of the binder in the positive electrode active material was 3 mass %. The adhesion quantity to area ratio of the binder was 12 mg/m$^2$.

Example 3

The secondary battery was manufactured in the same manner as that of Example 1 except that the first positive electrode active material, the second positive electrode active material, the binder resin, and the conductive auxiliary agent were mixed at a solid content mass ratio of 69.5:23:3.5:4. The content of the binder in the positive electrode active material was 3.5 mass %. The adhesion quantity to area ratio of the binder was 14 mg/m$^2$.

Examples of the embodiment of the present disclosure have been described so far. However, the above Examples are merely the examples of the embodiment of the present disclosure, and the technical scope of the embodiment of the present disclosure is not limited to the above specific structure of the embodiment.

Comparative Example 1

The secondary battery was manufactured in the same manner as that of Example 1 except that the first positive electrode active material, the second positive electrode active material, the binder resin, and the conductive auxiliary agent were mixed at a solid content mass ratio of 69:23:4:4. The content of the binder relative to the mass of the positive electrode active material was 4 mass %. The adhesion quantity to area ratio of the binder was 16 mg/m$^2$.

Comparative Example 2

The secondary battery according to Comparative Example 2 was manufactured in the same manner as that of Comparative Example 1 except that the size of the positive electrode active material layer and the size of the negative electrode active material layer were different from those of Comparative Example 1. The size of the positive electrode active material layer of Comparative Example 2 was 117 mm×205 mm. The size of the negative electrode active material layer was larger than that of the positive electrode active material layer by 2 mm both vertically and horizontally. The content of the binder relative to the mass of the positive electrode active material layer was 4 mass %. The adhesion quantity to area ratio of the binder was 16 mg/m$^2$.

Comparative Example 3

The secondary battery according to Comparative Example 3 was manufactured in the same manner as that of Example 1 except that the size of the positive electrode active material layer and the size of the negative electrode active material layer were different from those of Example 1. The size of the positive electrode active material layer of Comparative Example 3 was 24 mm×40 mm. The size of the negative electrode active material layer was larger than that of the positive electrode active material layer by 2 mm both vertically and horizontally.

Comparative Example 4

The secondary battery was manufactured in the same manner as that of Comparative Example 3 except that the first positive electrode active material, the second positive electrode active material, the binder resin, and the conductive auxiliary agent were mixed at a solid content mass ratio of 69.5:23:3.5:4. The content of the binder relative to the mass of the positive electrode active material was 3.5 mass %. The adhesion quantity to area ratio of the binder was 14 mg/m$^2$.

Comparative Example 5

The secondary battery was manufactured in the same manner as that of Comparative Example 3 except that the first positive electrode active material, the second positive electrode active material, the binder resin, and the conductive auxiliary agent were mixed at a solid content mass ratio of 69:23:4:4. The content of the binder relative to the mass of the positive electrode active material layer was 4 mass %. The adhesion quantity to area ratio of the binder was 16 mg/m$^2$.

Comparative Example 6

The secondary battery was manufactured in the same manner as that of Example 1 except that the amount of the binder added to the positive electrode active material layer was 1.7 mass % relative to the mass of the positive electrode active material layer. Since the amount of the binder was small, the formation of the positive electrode active material layer was difficult. The adhesion quantity to area ratio of the binder contained in the positive electrode active material layer was 6.8 mg/m$^2$.

[Evaluation of Positive Electrode Plate and Secondary Battery]

The cycle characteristics of the secondary batteries according to Examples 1 to 3 and Comparative Examples 1 to 5 were evaluated. The cycle characteristic of the secondary battery was evaluated by calculating the capacity retention ratio after conducting a 1C cycle test for 1000 cycles. Further, the negative electrode extracted by taking apart the secondary battery after the cycle test was observed.

Further, a swelling test of the positive electrode plate used in Comparative Examples 3 to 5 was performed. First, the positive electrode plate was immersed in propylene carbonate of 85° C. for 16 hours. The thickness of the positive electrode plate after the immersion was measured with a micrometer. The amount of increase in thickness of the positive electrode plate after the immersion (thickness magnification) was calculated.

Table 1 shows the cycle characteristics of the secondary batteries of Examples 1 to 3 and Comparative Examples 1 and 2, and the results of observing the negative electrodes thereof after the cycle test. Further, Table 2 shows the cycle characteristics of the secondary batteries of Comparative Examples 3 to 5, the results of observing the negative electrodes thereof after the cycle test, and the results of the swelling test

TABLE 1

| | Electrode size (positive electrode) | Content of binder | Positive electrode Adhesion quantity to area ratio of binder | Negative electrode precipitate | Battery 1 C cycle 1000 cyc Battery characteristics (capacity retention ratio) |
|---|---|---|---|---|---|
| Example 1 | horizontal 200 mm vertical 220 mm | 2% | 8 mg/m$^2$ | None | 90% |
| Example 2 | horizontal 200 mm vertical 220 mm | 3% | 12 mg/m$^2$ | None | 90% |
| Example 3 | horizontal 200 mm vertical 220 mm | 3.5% | 14 mg/m$^2$ | None | 90% |
| Comparative Example 1 | horizontal 200 mm vertical 220 mm | 4% | 16 mg/m$^2$ | Generated in center | 87% |
| Comparative Example 2 | horizontal 117 mm vertical 205 mm | 4% | 16 mg/m$^2$ | None | 90% |

TABLE 2

| | Electrode size (positive electrode) | Content of binder | Positive electrode Adhesion quantity to area ratio of binder | Thickness magnification in swelling test | Negative electrode precipitate | Battery 1 C cycle 1000 cyc Battery characteristic (relative value assuming Comparative Example 3 is 1) |
|---|---|---|---|---|---|---|
| Comparative Example 3 | horizontal 24 mm vertical 40 mm | 2% | 8 mg/m$^2$ | 1.07 times | None | 1 |
| Comparative Example 4 | horizontal 24 mm vertical 40 mm | 3.5% | 14 mg/m$^2$ | 1.07 times | None | 1 |
| Comparative Example 5 | horizontal 24 mm vertical 40 mm | 4% | 16 mg/m$^2$ | 1.1 times | None | 1 |

The comparison between Example 1 and Comparative Example 1 indicates that the insulating precipitate was generated in the center of the surface of the negative electrode active material layer (i.e., the surface of the negative electrode active material layer that is in contact with the separator) after the cycle test in the secondary battery of Comparative Example 1. The precipitate was not observed near the peripheral portion of the negative electrode plate. The precipitate was observed as a color-changed portion with an intermediate shape between an ellipse and a rectangle including the center portion. This color-changed portion was defined by the boundary approximately 66 mm inside from the four sides of the negative electrode plate. Since a thin film of an organic insulating substance was observed according to surface analysis, it is confirmed that this color change was caused by the precipitate. Then, the deterioration in cycle characteristics of the secondary battery of Comparative Example 1 as compared to the secondary battery in Example 1 was confirmed.

Moreover, the comparison between Comparative Example 1 and Comparative Example 2 indicates that even though the binder was contained by the same amount and the same adhesion quantity to area ratio, the insulating precipitate was not observed on the surface of the negative electrode active material layer after the cycle test in the secondary battery with a small electrode size. Thus, it is understood that the insulating precipitate was generated after the cycle test when the amount of the binder resin in the positive electrode active material was large and the electrode size was large. The details of this reason are unknown. Basically, however, this reason can be explained as below.

If the charge/discharge cycle is continuously performed, the release of lithium ions from the positive electrode active material during charging or the release of lithium ions from the negative electrode active material during discharging may not be performed sufficiently and efficiently depending on the design of the electrodes. In this case, the lithium ion concentration in the electrolyte in the pores of the power generating element is decreased gradually. Here, in the secondary battery with the relatively small electrode size, it is considered that lithium ions are supplied from the periphery of the power generating element by the transfer of lithium ions in a plane direction of the electrode plate (i.e., in a direction perpendicular to the direction of stacking the negative electrode plate and the positive electrode plate) through the interface between the separator and the negative electrode or the interface between the separator and the positive electrode. The decrease in lithium ion concentration is suppressed by this supply. On the other hand, in the secondary battery with the large electrode size, the distance from the periphery of the power generating element to the center in the in-plane direction of the electrode plate is long. Therefore, lithium ions supplied from the periphery of the power generating element do not reach the center in the in-plane direction of the negative electrode active material layer. Thus, in the center portion, the supply of lithium ions cannot keep up with the decrease in lithium ion concentration, thereby decreasing the lithium ion concentration. It is considered that this results in the unintended electrochemical reaction to produce the insulating precipitate. For example, in Comparative Example 1, the insulating precipitate existed in the portion 66 mm or more inside from the end face of the positive electrode active material layer of the positive electrode with the main plane that is smaller than the negative electrode (i.e., the end face perpendicular to the main plane of the positive electrode active material layer). It is considered that if the distance from the periphery of the power generating element (more specifically, from the end face of the electrode with the smaller main plane) to the center of the negative electrode is 66 mm or more, the supply of the lithium ions from the periphery of the power generating element is unable to keep up with the decrease of the ions. Thus, if the short side of the positive electrode becomes 132 mm, which is a double of 66 mm, or more, the precipitate starts to appear in the negative electrode. Moreover, as the electron transfer distance from the current collector to the electrode active material particle or the lithium ion transfer distance in the pore of the electrode active material layer is longer, the phenomenon that the intercalation and deintercalation of the lithium ions are unable to keep up with the decrease of the ions occurs more easily. Thus, it is considered that as the positive electrode and/or the negative electrode is thicker, the precipitate in the negative electrode appears more easily.

Note that in the above examination, the distance to the center based on the end face of the positive electrode with the smaller main plane than the negative electrode is focused. The reason thereof is explained below. A portion that does not have another opposing layer out of the positive and negative electrode active material layers does not have a narrow space. Therefore, lithium ions in the electrolyte can freely move. At the interface between the separator and the positive electrode active material layer, however, it is important that the lithium ions enter from the end portion of the interface to diffuse through the narrow interface and that the ions can move rapidly to the center of the power generating element. The electrolyte connects between the interface between the separator and the positive electrode active material layer and the interface between the separator and the negative electrode active material layer through the pore of the separator. The thickness of the separator is drastically smaller than the electrode surface size. Therefore, the mobility of lithium ions between these two interfaces does not lead to a problem as compared to the mobility in the electrode surface direction.

From the results of the swelling test in Comparative Examples 3 to 5 shown in Table 2, it was found that the swelling of the positive electrode active material layer in the swelling test was suppressed when the content of the binder or the adhesion quantity to area ratio of the binder in the positive electrode active material layer was small. In the cycle test of the battery of this size, however, the swelling degree in the swelling test and the cycle characteristics were not correlated with each other. As a result, the three results exhibited the similar cycle characteristics. The positive electrode obtained by increasing the size of the positive electrode in Comparative Examples 3 and 4, in which the swelling was small (the content of the binder was 2 mass % or more and 3.5 mass % or less, the adhesion quantity to area ratio of binder was 8 m g/m² or more and 14 mg/m² or less) among those above, was used in the secondary battery of each of Examples 1 to 3. On the other hand, the positive electrode obtained by increasing the size of the positive electrode in Comparative Example 5 was used in the secondary battery of Comparative Example 1. The comparison thereof indicates that the secondary battery of Examples 1 to 3 had the superior cycle characteristics. The details of the correlation between the swelling degree of the positive electrode and the cycle characteristics are unknown. Basically, however, this correlation can be explained as below, for example.

The swelling of the positive electrode active material layer observed in the swelling test is caused by the swelling of the binder by the organic solvent used as the electrolyte. Therefore, it is considered that even during the long-term cycle charging/discharging of the secondary battery, the same swelling phenomenon occurs in the positive electrode though the degree may vary. Thus, if the adhesion quantity to area ratio of the binder is small, for example, the swelling material becomes smaller. Thus, the swelling of the entire positive electrode active material layer is suppressed. Therefore, it is considered that the reduction of the space of the lithium ion flow path at the interface between the positive electrode active material layer and the separator is suppressed. On this occasion, the transfer resistance of lithium ions that move in the in-plane direction (in a direction parallel to the main plane of the positive electrode active material layer) at the interface between the positive electrode active material layer and the separator is reduced. As described above, it is considered that the lithium ion mobility between the interface between the separator and the positive electrode active material layer and the interface between the separator and the negative electrode active material layer does not lead to a problem as compared to the mobility in the in-plane direction. As a result, lithium ions are rapidly supplied to the surface of the negative electrode active material layer through the positive electrode active material layer. As a result, the generation of the insulating precipitate on the surface of the negative electrode active material layer is suppressed to suppress the deterioration in cycle characteristics.

Moreover, the content of the binder in the positive electrode of Comparative Example 5 was as high as 4%. Accordingly, the result of the swelling test was also a large value. However, the negative electrode precipitate was not observed and the cycle characteristics were similar to those of other samples containing a different amount of the binder. This supports the aforementioned fact that the problem in Comparative Example 1 occurs uniquely when the electrode size is large.

As described in Comparative Example 6, when the content of binder was 1.7% or less and the adhesion quantity to area ratio was 6.8 mg/m² or less, the film formation of the positive electrode active material layer was difficult.

In the nonaqueous electrolyte secondary battery according to the embodiment of the present disclosure as above, the content of binder relative to the mass of the positive electrode active material layer is in the range of 2 to 3.5 mass %. This suppresses the swelling of the positive electrode active material layer and reduces the transfer resistance of the electrolyte component of the positive electrode active material layer. The adhesion quantity to area ratio of the binder is in a predetermined range (8 to 14 mg/m²). This suppresses the swelling of the positive electrode active material layer and reduces the transfer resistance of the electrolyte component of the positive electrode active material layer. As a result, the transfer amount of lithium ions in the interface between the positive electrode active material layer and the separator is increased. The lithium ions are supplied through the positive electrode active material layer surface to the region between the interface between the positive electrode active material layer and the separator and the interface between the separator and the negative electrode active material layer when the charging and discharging are repeated. Thus, lithium ions can be rapidly supplied to the region between the positive electrode active material layer and the negative electrode active material layer (particularly, a portion facing the center of the electrode). This suppresses the generation of the insulating precipitate on the surface of the negative electrode active material layer. As a result, the deterioration in capacity retention ratio (cycle characteristics) of the secondary battery with the large electrode size is suppressed.

Moreover, by filling the periphery of the power generating element with the electrolyte, lithium ions flow into the active material layer from the side end portion of the active material layer with the smaller main plane. Thus, more lithium ions can be supplied to the region at the interface between the negative electrode active material layer and the separator. This suppresses the generation of the insulating precipitate on the surface of the negative electrode active material layer. As a result, the deterioration in capacity retention ratio (cycle characteristics) of the secondary battery with the large electrode size is suppressed.

The specific examples of the nonaqueous electrolyte secondary battery according to the embodiment of the present disclosure have been described so far. The nonaqueous electrolyte secondary battery according to the embodiment of the present disclosure, however, is not limited to the above embodiment. As long as the features of the nonaqueous electrolyte secondary battery according to the embodiment of the present disclosure are not impaired, the design of the embodiment of the present disclosure can be changed as appropriate.

For example, the size of the main plane of the positive electrode active material layer and the size of the main plane of the negative electrode active material layer are not limited to those of the embodiment of the present disclosure. Various secondary batteries in which, for example, the short side of the smaller one of the main plane of the positive electrode active material layer and the main plane of the negative electrode active material layer that are provided to face each other, is 132 mm or more can be provided.

The nonaqueous electrolyte secondary battery according to the embodiment of the present disclosure may be any one of the following first to fourth nonaqueous electrolyte secondary batteries.

A first nonaqueous electrolyte secondary battery is a nonaqueous electrolyte secondary battery including a power generating element including a positive electrode having a positive electrode active material layer and a negative electrode having a negative electrode active material layer, the positive electrode active material layer and the negative electrode active material layer being provided to face each other with a separator interposed therebetween, wherein: a main plane having the smaller area between a main plane of the positive electrode active material layer and a main plane of the negative electrode active material layer that face each other has a rectangular shape with a short side having a length of 132 mm or more; the positive electrode active material layer contains at least a positive electrode active material and a binder; and the content of the binder is 2 mass % or more and 3.5 mass % or less relative to the mass of the positive electrode active material layer.

A second nonaqueous electrolyte secondary battery is a nonaqueous electrolyte secondary battery including a power generating element including a positive electrode having a positive electrode active material layer and a negative electrode having a negative electrode active material layer, the positive electrode active material layer and the negative electrode active material layer being provided to face each other with a separator interposed therebetween, wherein: a main plane having the smaller area between a main plane of the positive electrode active material layer and a main plane of the negative electrode active material layer that face each other has a rectangular shape with a short side having a length of 132 mm or more; an adhesion quantity to area ratio $(mg/m^2)$ of the binder, which corresponds to a ratio of the weight of the binder in 1 g of the positive electrode active material layer $(mg/g)$ relative to the average specific surface area of the positive electrode active material layer $(m^2/g)$, is 8 or more and 14 or less.

A third nonaqueous electrolyte secondary battery is the first or second nonaqueous electrolyte secondary battery wherein: the power generating element is housed in an exterior body together with an electrolyte solution; and a space between each side of an active material layer having a rectangular main plane with a length of 132 mm or more on the short side and an inner peripheral surface of the exterior body is filled with the electrolyte solution.

A fourth nonaqueous electrolyte secondary battery is any of the first to third nonaqueous electrolyte secondary batteries wherein the binder contains polyvinylidene fluoride.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A nonaqueous electrolyte secondary battery comprising:
    a power generating element including a positive electrode having a positive electrode active material layer and a negative electrode having a negative electrode active material layer, wherein:
    a positive main plane of the positive electrode active material layer having a rectangular shape with a first side having a length of 132 mm or more;
    a negative main plane of the negative electrode active material layer having a rectangular shape with a second side having a length of 132 mm or more,
    the positive electrode active material layer and the negative electrode active material layer are provided such that the positive main plane and the negative main plane face each other with a separator interposed therebetween,
    the positive electrode active material layer containing a binder in an amount of 2 mass % or more and 3.5 mass % or less, and
    an exterior body housing the power generating element and an electrolyte, wherein an entire volume of the electrolyte is in a range of 1.2 to 1.6 times as large as a total of a pore volume of the positive electrode, a pore volume of the negative electrode, and a pore volume of the separator.

2. The nonaqueous electrolyte secondary battery according to claim 1, further comprising:
    wherein at least a space between an outer periphery of the positive main plane and an inner peripheral surface of the exterior body is filled with the electrolyte, and wherein each side of the power generating element is separated from the inner boundary of the exterior body by a distance of at least 1 mm.

3. A nonaqueous electrolyte secondary battery, comprising:
- a power generating element including a positive electrode having a positive electrode active material layer and a negative electrode having a negative electrode active material layer, wherein:
- a positive main plane of the positive electrode active material layer having a rectangular shape with a first side having a length of 132 mm or more;
- a negative main plane of the negative electrode active material layer having a rectangular shape with a second side having a length of 132 mm or more,
  - the positive electrode active material layer and the negative electrode active material layer are provided such that the positive main plane and the negative main plane face each other with a separator interposed therebetween,
  - an adhesion quantity to area ratio ($mg/m^2$) of a binder in the positive electrode active material layer is 8 or more and 14 or less, and
  - an exterior body housing the power generating element and an electrolyte, wherein an entire volume of the electrolyte is in a range of 1.2 to 1.6 times as large as a total of a pore volume of the positive electrode, a pore volume of the negative electrode, and a pore volume of the separator.

4. The nonaqueous electrolyte secondary battery according to claim 3, further comprising:
- wherein at least a space between an outer periphery of the positive main plane and an inner peripheral surface of the exterior body is filled with the electrolyte, and wherein each side of the power generating element is separated from the inner boundary of the exterior body by a distance of at least 1 mm.

5. The nonaqueous electrolyte secondary battery according to claim 1, wherein the binder contains polyvinylidene fluoride.

6. The nonaqueous electrolyte secondary battery according to claim 2, wherein the binder contains polyvinylidene fluoride.

7. The nonaqueous electrolyte secondary battery according to claim 3, wherein the binder contains polyvinylidene fluoride.

8. The nonaqueous electrolyte secondary battery according to claim 4, wherein the binder contains polyvinylidene fluoride.

9. The nonaqueous electrolyte secondary battery according to claim 2, wherein each side of the power generating element except for a terminal leading side is separated from the inner peripheral surface of the exterior body by a distance of 1 to 5 mm.

10. The nonaqueous electrolyte secondary battery according to claim 4, wherein each side of the power generating element except for a terminal leading side is separated from the inner peripheral surface of the exterior body by a distance of 1 to 5 mm.

* * * * *